United States Patent [19]

Bayles et al.

[11] 3,989,875

[45] Nov. 2, 1976

[54] MICA BASED ELECTRICAL INSULATION

[75] Inventors: Francis Derrick Bayles, Montreal; Michael Alan Dudley, Beaconsfield, both of Canada

[73] Assignee: Canada Wire and Cable Limited, Toronto, Canada

[22] Filed: July 15, 1974

[21] Appl. No.: 488,408

[30] Foreign Application Priority Data

June 21, 1974 Canada ............................... 203081

[52] U.S. Cl. ........................... 428/447; 260/46.5 E; 260/46.5 G; 427/387; 428/454

[51] Int. Cl.² ........................................... B32B 9/04

[58] Field of Search ........... 117/123 C, 123 D, 152, 117/155 R, 161 ZA, 162; 260/46.5 E, 46.5 G; 428/324, 447, 454; 427/387

[56] References Cited

UNITED STATES PATENTS

| | | | |
|---|---|---|---|
| 3,146,799 | 9/1964 | Fekete | 117/161 |
| 3,388,092 | 6/1968 | Heying et al. | 260/46.5 E |
| 3,463,801 | 8/1969 | Papeth et al. | 260/46.5 G |
| 3,511,698 | 5/1970 | Talcott | 117/161 |
| 3,637,589 | 1/1972 | Kwasnik et al. | 117/161 |
| 3,671,489 | 6/1972 | Barnes et al. | 260/46.5 E |
| 3,733,298 | 5/1973 | Knollmueller | 117/161 |
| 3,840,393 | 10/1974 | Ishizaka et al. | 117/123 D |

FOREIGN PATENTS OR APPLICATIONS

| | | | |
|---|---|---|---|
| 569,530 | 1/1959 | Canada | 260/46.5 G |

OTHER PUBLICATIONS

Schroeder, H. A. "Carboransiloxane Polymers", Feb., 1969, pp. 58–64.

*Primary Examiner*—Ronald H. Smith
*Assistant Examiner*—Sadie L. Childs
*Attorney, Agent, or Firm*—Fleit & Jacobson

[57] ABSTRACT

A mica based electrical insulation for high temperature applications comprising reconstituted micaceous sheets impregnated with an impregnant of the family of poly (carborane siloxane) containing carborane moieties linked by siloxy groups at approximately 2–25% by weight of impregnant based on total weight of impregnated mica. The method for producing the mica based electrical insulation comprises the steps of solubilizing a poly (carborane siloxane) in a suitable solvent at a loading such as to produce a final insulation composite containing the desired weight of impregnant, placing a mica sheet of desired thickness on a suitable support, impregnating the supported mica sheet with the solution so as to achieve complete wetting, and curing the impregnated mica sheet for a time interval and at a temperature sufficient to effect cross-linking of the polymer.

7 Claims, No Drawings

MICA BASED ELECTRICAL INSULATION

This invention relates to a mica based electrical insulation and to a method of producing the same.

Mica has long been known to have outstanding dielectric properties. In single platelet form, however, it is extremely rigid and is suitable only for use as support for conductive or resistive wiring. Mica may be delaminated by various means, and the resulting small platelets segregated and reconstituted to form relatively flexible thin sheets known as mica paper. This practice is becoming increasingly important as supplies of good quality mica plate are becoming exhausted. There is also a small production of paper and composite using synthetic mica artificially made by various means. Mica paper relies for its physical integrity upon secondary attractive forces between adjacent platelets, at the atomic level. As a result, mica paper is very fragile, and it is common practice to use an impregnant or binder to improve its handling characteristics and integrity. Among the binders employed are inorganic salts and organic polymers.

Combining inorganic salts with mica paper results in a composite which is virtually as rigid as mica plates, limiting its usefulness to electrical supports, etc. Fabrication of salts impregnated mica paper is a costly and tedious process involving high temperatures and pressure to achieve optimum performance. However, most of these materials do have outstanding thermal stability at or above 1,000° F.

Virtually any organic polymer is suitable as a binder for mica paper. However, for relatively high temperature service; only poly (organo-siloxanes) are claimed to have good thermal stability and retention of physical properties. They are not generally recommended for service at or above 800° F.

It is the object of the present invention to provide a mica based electrical insulation which is fairly easy to manufacture, which has good performance properties at normal service temperatures of less than e.g. 250° F, and which has significant retention of service properties after repeated exposures to temperatures above 1,000° F.

The mica based electrical insulation, in accordance with the invention, comprises a reconstituted mica sheet impregnated with an impregnant of the family of poly (carborane siloxane). This polymer contains carborane moieties linked by siloxy groups.

Surprisingly, it was found that, although carborane siloxane polymers are cited for service to a maximum of 1,000° F, beyond which significant deterioration of properties could be expected, when these polymers were combined with mica in the manner herein described, a composite sheet was formed which retained a significant proportion of its properties after repeated exposure to 1,250° F in air.

Some of the carborane siloxane materials that have been found particularly good as impregnating materials for reconstituted micaceous sheets include decaborane siloxane polymers such as the ones known under the trademark Dexsil and sold by Olin Mathieson Company, pentaborane siloxane polymers such as the ones known under the trademark Pentasil and sold by Chemical Systems Inc., and mixed meta- and paradecaborane siloxane polymers such as the ones known under the trademark D2 and belonging to Union Carbide Corporation. Copolymers of deca- and penta-borane siloxane polymers as well as physical combinations of deca- and penta-borane siloxane polymers have also been advantageously used.

To produce the mica based electrical insulation, a carborane siloxane polymer such as one or a combination of the ones mentioned above is solubilized in suitable solvents such as ethers, chlorinated hydrocarbons, aromatics and mixtures thereof. It is to be noted that such polymers are not soluble in water and/or alcohols. This is convenient because water and alcohols, when used with reconstituted mica sheets, cause disintegration of the laminations and render incorporation of the polymer very difficult. The solid loading may vary between 20 and 50% by weight of polymer on total weight of the solution but is preferably used as a 30% weight by weight solution with xylene as the major constituent of the solvent. In any event, the solid loading must be such as to produce a mica composite containing 2–25% by weight of impregnant based on the total weight of impregnated mica.

A mica sheet of a desired thickness is then placed on a suitable support such as a metal screen. During experimentation, the mica paper used was a two thousandths of an inch thick reconstituted sheet known under the trademark Samica 4200 and sold by 3M Company. It will be understood that the invention is not limited to this paper and it is expected that any reconstituted mica sheet of any desired thickness may be used.

The supported mica sheet is then impregnated with the polymer solution so as to achieve complete wetting. Any excess solution is then removed. The impregnated mica sheet is subsequently cured by the known oxidative cross-linking method at a temperature varying from 100° to 400° C for a time period varying from 15 minutes to 2 hours. A preferred curing cycle in air is 15 minutes at 100° C, followed by 30 minutes at a temperature above which initial oxidative reaction becomes significant. It is understood that this schedule is in no way limiting and that other time/temperature combinations would be obvious to someone skilled in the art to effect the oxidative cross-linking of the polymer. Although the mechanism of cure of these polymers is cited as oxidative cross-linking, it is to be understood that other curing methods to effect cross-linking of the polymer are also envisaged. It was also found that a further period of heat aging of the impregnated sheet after cure at between 100° C and 400° C for between 1 and 24 hours resulted in improved properties.

Alternatively, it was found that the carborane siloxane polymers used as impregnants could be heat aged in air at a temperature varying between 100° and 500° C for a period of time varying between 1 and 24 hours before being solubilized for use. After impregnation with an heat aged polymer, the impregnated mica sheet could be exposed to the preferred heat cure either with or without subsequent heat aging.

The weight pick-up of polymeric material after curing and optional heat aging is between 2 and 25% by weight on total weight of impregnated mica, and preferably between 6 and 12% as indicated in the following Table.

After impregnation, several mica-polymer composite sheets were evaluated for flexibility, visual appearance, handling properties, abrasion resistance, tensile strength and dielectric breakdown. They were then exposed to a test cycle which evaluated moisture absorption and weight change. This cycle was as follows: (1.) Hold sample at 200° C to constant weight. (2. )

Expose to 100% relative humidity at 25° C for 1 hour, weight. (3.) Expose to 1,250° F for 1 hour, cool 5 minutes, reexpose to 1,250° F for 1 hour, cool at 0% relative humidity at 25° C, weigh. (4.) Expose to 100% relative humidity at 25° C for 2 hours, weigh. The values are reported in the following Table as moisture pick-up both before and after high temperature exposure, and overall weight change. The tensile strength of the sheets was also determined after exposing samples to 1,250° F for 1 hour. Dielectric strength measurements were made, using a DC source and ¼ inch electrodes in air after conditioning for 16 hours at 25° C/50% relative humidity. Concurrently, and for purposes of comparison only, samples were evaluated which had been impregnated to approximately the same weight pick-up using a poly (organosiloxane) known under the trademark DC 935, a product of the Dow Corning Company. The results of the experiments may be found in the following Table.

TABLE

EVALUATION OF POLY (CARBORANE SILOXANE) IMPREGNATED 0.002 in. MICA SHEET

| Sample | Impregnant | Cure[a] °C | Weight Pick Up of impregnant, % | Weight Changes in Exposure Cycle, %[b] | | | [c] | Changes in Physical Properties[d] | | | | Tensile Strength lb./inch Width | Dielectric Breakdown Voltage, KV,DC |
|---|---|---|---|---|---|---|---|---|---|---|---|---|---|
| | | | | 1 | 2 | 3 | | Flexure (1) | Flexure (2) | Handling | Abrasion Resistance | | |
| 1 | Dow Corning 935, 25 % w/w in xylene | 30'/100<br>30'/275 | 8.5 | +0.12 | +1.08 | −4.08 | Before | 10 | 10 | 8 | 8 | 16.0 | 2.46 |
| | | | | | | | After | 1 | 0* | 3 | 8 | 8.0 | 2.35 |
| 2 | Dexsil 300 30 % w/w in xylene | 15'/100<br>30'/200<br>30'/300 | 8.9 | +0.43 | +2.65 | −0.07 | Before | 10 | 10 | 10 | 10 | 11.5 | 2.33 |
| | | | | | | | After | 2 | 1** | 8 | 8 | 14.0 | 2.70 |
| 3 | Dexsil 300 30 % w/w in xylene | 15'/100<br>30'/200<br>30'/300<br>240'/200 | 8.5 | +0.24 | +2.34 | −0.18 | Before | 10 | 10 | 10 | 10 | 19.5 | 2.83 |
| | | | | | | | After | 2 | 2** | 10 | 10 | 22.0 | 2.76 |
| 4 | Dexsil 300 Heat aged 1 hr./300° C 30 % w/w in xylene | 15'/100<br>30'/200<br>30'/300 | 9.8 | +0.32 | +2.96 | +0.24 | Before | 10 | 10 | 10 | 9 | 15.0 | 2.82 |
| | | | | | | | After | 2 | 1** | 10 | 10 | 19.5 | 2.58 |
| 5 | Dexsil 300 Heat aged 1 hr./300° C 30 % w/w in xylene | 15'/100<br>30'/200<br>30'/300<br>240'/200 | 10.6 | 0 | +3.11 | +0.24 | Before | 10 | 10 | 10 | 9 | 15.0 | 2.07 |
| | | | | | | | After | 2 | 1** | 9 | 10 | 25.0 | 2.20 |
| 6 | D2'[e], 20 % w/w in 45 % xylene, 35 % methylene chloride | 15'/100<br>30'/200<br>30'/300 | 11.17 | +2.08 | +7.16 | −0.08 | Before | 10 | 10 | 10 | 10 | 29.0 | 4.32 |
| | | | | | | | After | 10 | 3 | 10 | 10 | 24.0 | 3.38 |
| 7 | D2''[f], 20 % w/w in xylene | 15'/100<br>30'/450 | 9.16 | +6.48 | +7.66 | −1.46 | Before | 10 | 10 | 10 | 10 | 24.0 | 3.75 |
| | | | | | | | After | 10 | 3 | 10 | 10 | 15.5 | 3.30 |
| 8 | Dexsil 400-φ 30 % w/w in xylene | 15'/100<br>30'/350 | 11.25 | +1.18 | +2.55 | −1.65 | Before | 10 | 10 | 10 | 10 | 33.0 | 4.23 |
| | | | | | | | After | 10 | 4 | 10 | 10 | 38.5 | 2.88 |
| 9 | Pentasil 10, 30 % w/w in xylene | 15'/100<br>30'/200<br>30'/300 | 7.81 | +2.27 | +1.09 | −0.98 | Before | 10 | 10 | 10 | 10 | 38.0 | 3.81 |
| | | | | | | | After | 9 | 3 | 10 | 10 | 24.0 | 3.45 |
| 10 | Pentasil 10D, 30 % w/w in xylene | 15'/100<br>30'/250 | 9.91 | +0.80 | +2.68 | −0.69 | Before | 10 | 10 | 10 | 10 | 33.0 | 4.36 |
| | | | | | | | After | 10 | 2 | 10 | 10 | 27.0 | 3.18 |
| 11 | Pentasil 15, 30 % w/w in xylene | 15'/100<br>30'/250 | 11.6 | +0.13 | +3.65 | −0.97 | Before | 10 | 10 | 10 | 10 | 32.0 | 3.96 |
| | | | | | | | After | 10 | 8 | 10 | 10 | 28.5 | 2.64 |
| 12 | Control Dexsil 300,[g], 30 % w/w in xylene | 15'/100<br>30'/300 | 11.0 | +0.04 | +4.52 | −0.04 | Before | 10 | 10 | 10 | 10 | 30.5 | 4.56 |
| | | | | | | | After | 10 | 8 | 8 | 10 | 38.0 | 4.88 |

*Disintegrated by flaking on flexure.
**Clean break, no flaking.
[a]Consecutive cure cycles.
[b]1. Initial moisture pick up
2. Moisture pick up after 1,250° C exposure
3. Overall weight loss or gain.
[c]Rated before and after exposure to test cycle.
[d]Rated 10 best, 0 worst. Flexure (1) = number of times strip could be folded over 360° without failure; Flexure (2) = number of times strip could be folded over an 0.08 in. diameter wire without failure. Handling = general resistance to manipulation. Abrasion resistance = resistance to abrasion by blunt object.
[e]D2' is a mixed m-p carborane siloxane polymer whose side chain substituents are all methyl groups.
[f]D2'' is a mixed m-p carborane siloxane polymer whose side chain substituents are both methyl and phenyl.
[g]Preheataged for 2 hours at 200° C before making up solution; cure cycle mirrors preferred embodiment.

It will be seen from the above Table that, after exposure to a temperature of 800° F and higher, the impregnated micaceous sheet, in accordance with the invention, has, in comparison to prior art compositions such as poly(organosiloxane):

a. a significantly lower weight loss;
b. a significantly higher level of physical integrity, abrasion resistance and flexibility;
c. a superior tensile strength;
d. superior dielectric properties; and
e. no significant outgassing or sublimation.

While the main application of the above disclosed composite is intended for electrical insulation and high temperature, it is to be understood that it may be used independently for electrical insulation or for thermal insulation.

What is claimed is:

1. A mica based composite comprising a reconstituted micaceous sheet impregnated with an impregnant off the family of poly (carborane siloxane) containing carborane moieties linked by siloxy groups at approximately 2 to 25% by weight of impregnant based on the total weight of impregnated mica.

2. A mica based composite as defined in claim 1, wherein the poly (carborane siloxane) is a decarborane siloxane polymer.

3. A mica based composite as defined in claim 1, wherein the poly (corborane siloxane) is a pentaborane siloxane polymer.

4. A mica based composite as defined in claim 1, wherein the poly (carborane siloxane) is a mixed meta- and para- decarborane siloxane polymer.

5. A mica based composite as defined in claim 1, wherein the poly (carborane siloxane) is a copolymer of deca-and penta- borane siloxane.

6. A mica based composite as defined in claim 1, wherein the poly (carborane siloxane) is a physical combination of deca- and penta- borane siloxane polymers.

7. A mica based composite as defined in claim 1, wherein the impregnant is present at approximately 6 to 12% by weight.

* * * * *